United States Patent [19]

Haight

[11] 4,421,218

[45] Dec. 20, 1983

[54] RELIEF VALVE MEANS FOR ROTATABLE FLUID-PRESSURE MECHANISMS

[75] Inventor: Robert E. Haight, Waterloo, Iowa

[73] Assignee: Deere & Company, Moline, Ill.

[21] Appl. No.: 230,464

[22] Filed: Feb. 2, 1981

[51] Int. Cl.³ .......................................... F16D 25/063
[52] U.S. Cl. .......................... 192/106 F; 192/85 AA; 192/103 FA
[58] Field of Search ........... 192/85 AA, 85 A, 106 F, 192/103 FA, 104 F; 91/442

[56] References Cited

U.S. PATENT DOCUMENTS

| | | | |
|---|---|---|---|
| 2,740,512 | 4/1956 | Fischer | 192/85 AA |
| 2,876,743 | 3/1959 | Maki | 192/106 F |
| 3,576,241 | 4/1971 | Maurice et al. | 192/85 AA |
| 3,647,037 | 3/1972 | Toma | 192/106 F |
| 3,974,743 | 8/1976 | Ivey | 192/106 F X |
| 4,147,245 | 4/1979 | Folomin et al. | 192/85 AA |
| 4,238,020 | 12/1980 | Nerstad et al. | 192/104 F X |
| 4,271,951 | 6/1981 | Nishimuka et al. | 192/106 F |
| 4,318,311 | 3/1982 | Ross | 192/104 F X |

FOREIGN PATENT DOCUMENTS 1273859 5/1972 United Kingdom .
1476722 6/1977 United Kingdom .

*Primary Examiner*—Rodney H. Bonck
*Attorney, Agent, or Firm*—Henderson & Sturm

[57] ABSTRACT

Disclosed is a fluid-pressure operated mechanism such as a clutch having radial walls defining a fluid-receiving and exhausting chamber between them. The clutch is of the hydraulic-apply, spring-release type, fluid pressure being supplied to engage the clutch and fluid pressure being exhausted to release the clutch. Fluid pressure release is often not rapid enough to enable quick release of the clutch and relief valve means of the centrifugal type is provided to accelerate fluid release. The improvement resides in spring means in combination with the centrifugal valve to prevent operation of that valve during rotation of the clutch at speeds below a predetermined value, whereby to prevent complete dumping of fluid, so as to enable the released clutch to retain a volume of fluid consistent with rapid re-engagement of the clutch when fluid pressure is applied.

3 Claims, 2 Drawing Figures

RELIEF VALVE MEANS FOR ROTATABLE FLUID-PRESSURE MECHANISMS

SUMMARY OF THE INVENTION

The U.S. Pat. to Fisher, No. 2,740,512 discloses a type of centrifugally-responsive valve for accelerating dumping of clutch fluid upon release of a hydraulic-apply, spring-release clutch. In that patent, the clutch has a pair of opposed, coaxial radial walls, one of which is the fluid-receiving piston. This piston has therein a passage extending therethrough on an axis spaced radially from and parallel to the axis of rotation of the clutch, the passage leading from the expansible chamber between the walls to the interior of the clutch. Within the passage is a conical ball valve seat having its large end facing toward the chamber and a ball is seatable on the seat when the clutch is pressurized but is capable of rolling off the seat upon depressurizing of the clutch because of the centrifugal force acting on the ball. There may be a plurality of such relief valves spaced circumferentially about the piston. Thus, when the clutch is depressurized, fluid is exhausted from the chamber not only via the main control valve but also via the relief valves. During operation, however, centrifugal force cannot overcome the fluid pressure in the chamber and the balls remain seated and the clutch remains engaged until the control valve is operated to release it.

One problem inherent in a design such as just described is that the balls become unseated substantially immediately upon release of clutch-apply pressure. Thus, at low speed rotation or no rotation, the hydraulic fluid drains from the clutch chamber, requiring considerable time and volume to fill the chamber for clutch engagement, thus causing a significant time delay before the clutch can be re-engaged. The present invention solves that problem by the use of a low-force spring acting on the ball to retain it in seated position at and below a predetermined speed of rotation of the clutch. The spring force and seat angle are selected on the basis of enabling the ball to become unseated by centrifugal force at speeds above the predetermined speed when apply pressure is released by operation of the main control valve. This enables retention in the clutch of such volume of hydraulic fluid as to reduce fill time when apply pressure is again exerted.

Another feature of the invention is that the relief valves are provided in a radial wall of the clutch other than the piston. This facilitates manufacture and assembly because, for one reason, the chamber may be connected to the relief passage by a radial bore leading from the chamber and intersecting the relief passage. The intersection of the passages is used as a seat for one end of the low-force spring, the other end of which acts on the ball in a direction to keep it seated according to the parameters outlined above. Since the relief passage opens exteriorly of the wall in which it is located, its outlet or discharge end may be formed as a counterbore in which is fitted an annular member formed with the ball seat. This facilitates machining of the seat and enables easy installation of the spring and ball, besides permitting the annular member to be made of hardened material.

DETAILED DESCRIPTION OF THE PREFERRED EMBODIMENT

Figure 1:
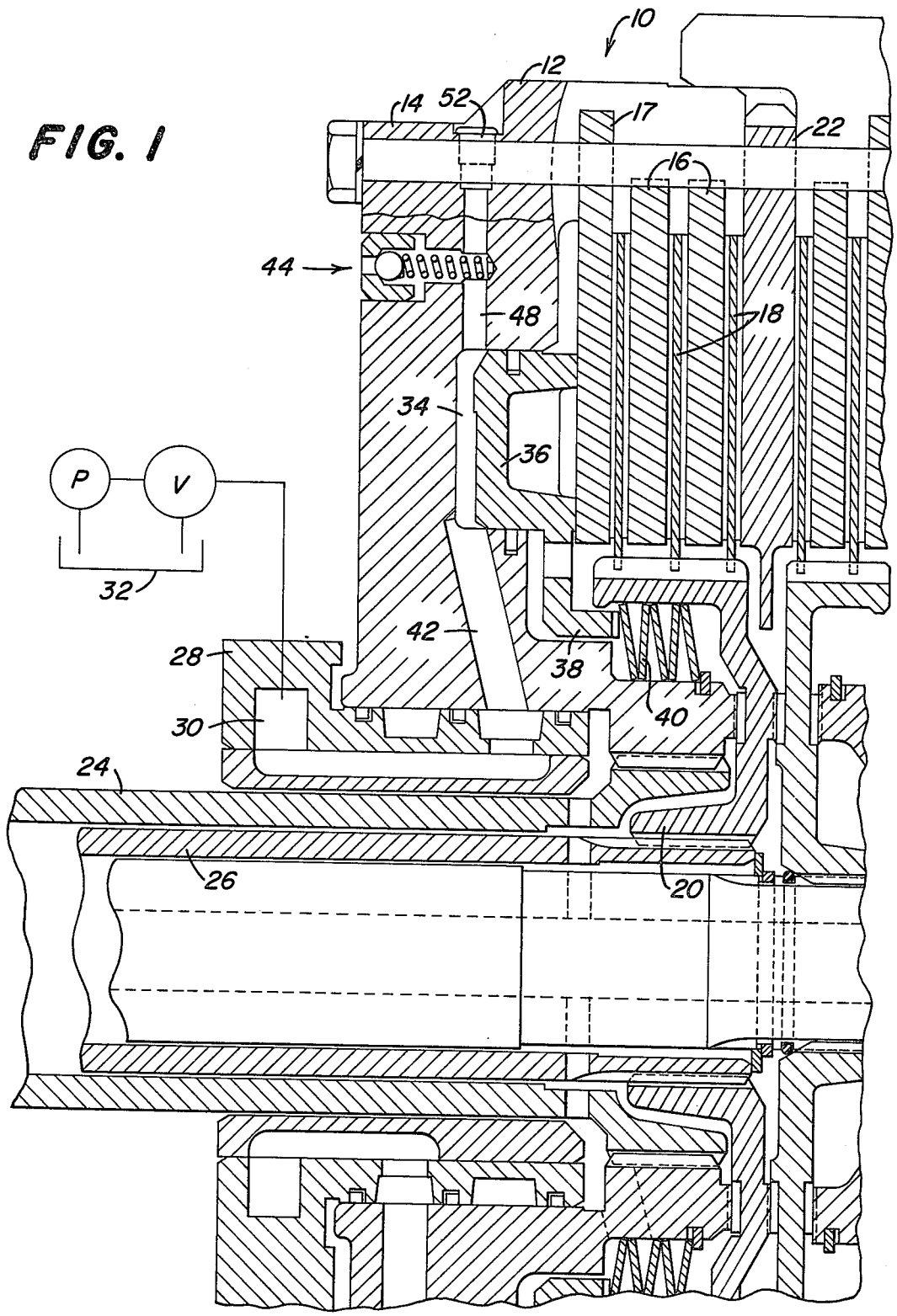
FIG. 1 is an approximately half section of a clutch in which the invention is utilized, the view showing also a schematic representation of a suitable main control valve.

The clutch construction chosen for purposes of illustration is but representative of many forms of hydraulically-operated, power-transmitting mechanisms to which the invention may be applied. The clutch here, as is typical of similar clutches, comprises a housing 10 rotatable about a central axis. The part of the housing seen at the left of FIG. 1 may be termed the driving part and is basically a drum 12 having a radial wall 14 and provided with a pressure plate 17, a plurality of clutch separators 16, typically interleaved with clutch plates 18 splined to a driven part 20, the pack of plates being compressible axially against a backing plate or divider 22. The clutch shown here is of the multiple type and a second clutch is disposed at the right of the backing plate 22. This is not a significant aspect of the invention and will not be described further.

The drum 12 is centrally splined to a hollow shaft 24 and the driven part 20 is centrally splined to a hollow shaft 26. The destinations and purposes of the shafts are not important and further description thereof is unnecessary. These shafts extend axially through a hollow portion 28 of a transmission casing (not shown per se) and this portion contains hydraulic fluid passage means 30 connected to a main control valve V which is, in turn, typically associated with a fluid pump P and reservoir 32, which may here be part of the transmission case sump as is generally conventional. It should be noted, however, that the main control valve may be of any type and for that reason has been shown schematically.

The interior or front face of the radial wall 14 of the drum 12 has therein an annular chamber 34 within which is axially slidably received the rear portion of a piston 36 serving as a second, movable radial wall cooperating with the front of the rear radial wall 14 to define the fluid chamber 34. The piston has an inner annular skirt 38 biased by a conventional conical spring pack 40 to a position of clutch disengagement. Additional springs, not shown, may be provided at the outer periphery of the clutch to bias the pressure plate 17 and the backing plate 22 apart. These have been omitted here in the interests of clarity. One or more radial fluid passages, such as that shown at 42, leads from the central passage means 30 to the chamber 34. When the valve V is moved to "apply" position, fluid under pressure fills the chamber 34, moves the piston against the pressure plate 17 causing the separator plates 16 and the clutch plates 18 to contact each other, thereby engaging the clutch, at which time the spring release pack 40 is compressed. When the valve is moved to "disengage" position, fluid from the chamber 34 is returned to reservoir as the spring pack moves the piston to the rear (left, as seen in FIG. 1).

Figure 2:
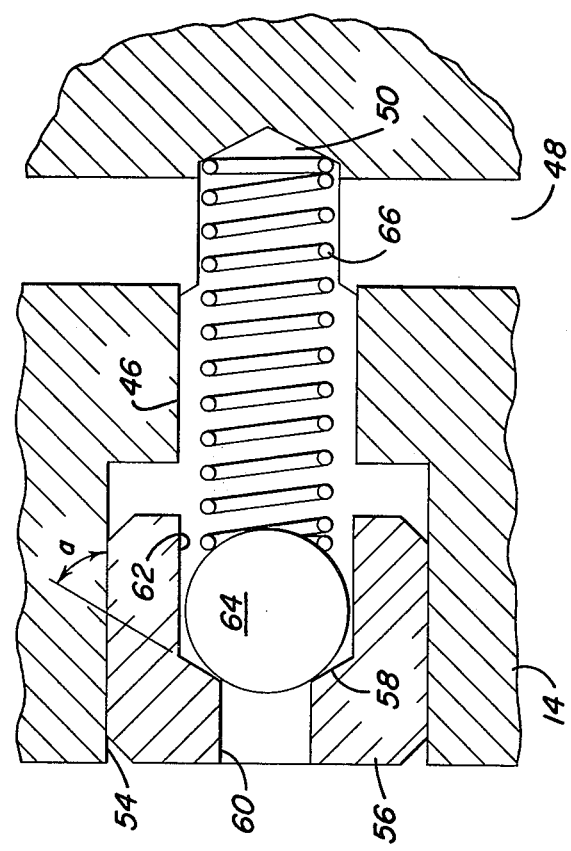
FIG. 2 is an enlarged fragmentary section better illustrating the relief valve means.

The relief valve means, according to the present invention, is designated in general by the numeral 44. As previously noted, there may be several of these spaced circumferentially about the axis of rotation and adjacent to the outer periphery of the clutch. Since these are all alike, a description of one will suffice for all. This is best shown in detail in FIG. 2. A passage 46 extends through the wall 14 of the drum 12 on an axis spaced radially from and parallel to the axis of rotation. The front or inner end of this passage is connected to the chamber 34 via a radial passage 48 that extends from the chamber, intersects the relief passage 46 at 50 and continues radially outwardly to the periphery of the drum 12, at which point it is plugged at 52. This type of design facilitates machining of the drum, since the passage 48 may be drilled inwardly from the drum periphery to the chamber 34.

The relief passage 46 is formed as a series of counterbores, the outer one of which is larger than the interior of the passage and is designated at 54. An annular member 56 is tightly received coaxially in the counterbore and is formed interiorly with a conical or ramped valve seat 58 coaxial with a discharge outlet bore 60 and an inner guide bore 62. Because the member 56 is not a cast-in part of the drum 12, it may be separately and more accurately machined. A ball valve 64 controls the outlet bore 60 via seating on and unseating from the seat 58. According to the present invention, the ball is biased to seated condition by a low-force spring means 66, here a helical compression spring. As will be described subsequently in detail, the spring force and seat angle are such that the ball remains seated when the main control valve V is actuated to release fluid pressure from the chamber 34 during low-speed or no rotation of the clutch. However, the spring force will be overcome by centrifugal force at speeds above a predetermined value when the main control valve releases the clutch. As previously explained, this is for the purpose of preventing complete draining of the chamber 34 at low or no speed while enabling opening of the ball valve at high speeds to assure quick release at high speeds when the clutch is released. That is to say, the relief valve operates in conjunction with depressurizing of the chamber 34 by the main control valve to accelerate exhaust of the chamber rapidly enough to assure disengagement under the force of the spring pack 40. It should be noted, that when additional springs are present at the outer periphery of the clutch, these springs will omit the spring pack 40 in returning the piston 36 to its initial position. The seat angle A is slected so as to enable the ball to roll radially outwardly for the purpose and under the conditions just described. The spring force and seat angle are dependent upon many variables, such as clutch diameter, volume of the chamber 34, radial distance of the relief valve means 44 from the axis of rotation, diameter and weight of the ball 64, etc. A formula for the calculation of the seat design without a spring is known to those versed in the art. One example of such formula is that used in the calculation of the so-called Buick valve, appearing at pages 52 and 53 of the "General Motors Engineering Journal" for March-April 1954. In order to use any portion of that formula, the spring force must be equated with the pressure force.

In the present case, by way of example, the diameter of the drum 12 is approximately thirteen inches, the center line of the relief valve means 44 is spaced approximately five inches from the axis of rotation, the diameter of the piston is in the order of nine inches, the ball diameter is about one-quarter inch, the angle a is about fifty degrees, etc. The force exerted on the ball is in the area of 1.2 lbs.

It will be understood that, when the chamber 34 is pressurized, the pressure acts, in conjunction with the spring 66, to keep the ball 64 on its seat. When the chamber is depressurized by the main control valve, fluid pressure on the ball decays and, if the speed of rotation is above the predetermined value, say 2200 r.p.m., centrifugal force acting on the ball overcomes the spring force and the ball rolls outwardly on its seat and chamber fluid exits via the now open relief valve means 44. This assures quick release of the clutch under action of the spring pack 40. Again, if additional springs are present at the outer periphery of the clutch, these also will assist the spring pack 40 in assuring a quick release. However, when the speed of rotation falls below the predetermined value, centrifugal force also falls off and the spring 66 will cause the ball to seat, preventing the escape of such a large volume of fluid from the chamber as would materially add to fill time and consequent delay in re-engagement of the clutch by the main control valve.

The forming of the member 56, as a separate part, affords many advantages; e.g., the passage 46 may be easily drilled from outside the drum; the intersection of the passages at 50 provides a convenient seat for the inner end of the spring; the spring, valve and member may be easily installed from the outside rear of the drum 12; and, as said before, the member may be accurately machined, especially as to the seat therein. These and other advantages and features of the invention will have become apparent to those versed in the art, along with modifications in the preferred embodiment of the invention disclosed, all without departure from the spirit and scope of the invention.

I claim:

1. Hydraulically-operated, power transmitting mechanism having a housing rotatable about an axis and including a first axially fixed radial wall and a second, axially shiftable radial wall defining between them a chamber whose volume varies in response to control means operative to selectively pressurize and depressurize the chamber, and pressure relief valve means of the centrifugally responsive type including a passage extending through one wall on an axis parallel to and spaced radially from the axis of rotation and leading from the chamber to a dump outlet exteriorly of the chamber, a seat in and coaxial with the passage and a ball closable on the seat via pressurizing of the chamber irrespective of speed of rotation of the housing and unseatable via centrifugal force upon depressurizing of the chamber so as to accelerate the exhaust of fluid from the chamber, characterized in that spring means acts on the ball in its seating direction to retain the ball seated upon depressurizing of the chamber by the control means during speeds of rotation of the housing below a predetermined value and to enable unseating of the ball during depressurizing of the chamber via the control means during speeds of rotation above said value and the chamber is extended radially as a passage intersecting the relief passage and the spring means acts between the ball and the intersection of the passages.

2. The mechanism of claim 1, further characterized in that both passages are disposed in the axially fixed wall.

3. The mechanism of claim 1, further characterized in that the discharge outlet end of the relief passage is formed as an enlarged counterbore, an annular member is coaxially and tightly received in the counterbore, and the valve seat is formed in said member.

* * * * *